United States Patent

(12) United States Patent
Peterson et al.

(10) Patent No.: US 9,230,130 B2
(45) Date of Patent: Jan. 5, 2016

(54) SYSTEM AND METHOD FOR RULES-BASED CONTROL OF CUSTODY OF ELECTRONIC SIGNATURE TRANSACTIONS

(71) Applicant: DocuSign, Inc., Seattle, WA (US)

(72) Inventors: Donald G. Peterson, Kirkland, WA (US); Doug Rybacki, Seattle, WA (US); Duane E. Wald, Kent, WA (US)

(73) Assignee: DocuSign, Inc., Seattle, WA (US)

( * ) Notice: Subject to any disclaimer, the term of this patent is extended or adjusted under 35 U.S.C. 154(b) by 254 days.

(21) Appl. No.: 13/838,233

(22) Filed: Mar. 15, 2013

(65) Prior Publication Data

US 2013/0263283 A1 Oct. 3, 2013

Related U.S. Application Data

(60) Provisional application No. 61/614,371, filed on Mar. 22, 2012.

(51) Int. Cl.
*G06F 7/04* (2006.01)
*G06F 17/30* (2006.01)
(Continued)

(52) U.S. Cl.
CPC .......... *G06F 21/6218* (2013.01); *G06F 21/645* (2013.01); *G11B 20/00862* (2013.01); *G06F 2221/2137* (2013.01); *H04L 2209/603* (2013.01); *H04L 2463/101* (2013.01)

(58) Field of Classification Search
CPC .................... G11B 20/0086; G11B 20/00847; G11B 20/00869; G11B 20/00731; G11B 20/00427; G06F 21/10; H04N 21/4627; H04L 2463/101; H04L 2209/60; H04L 2209/603; G06Q 30/06; G06Q 30/1235
See application file for complete search history.

(56) References Cited

U.S. PATENT DOCUMENTS 5,040,142 A 8/1991 Mori et al.
5,220,675 A 6/1993 Padawer et al.
(Continued)

FOREIGN PATENT DOCUMENTS

CN 101299256 11/2008
EP 1238321 6/2001
(Continued)

OTHER PUBLICATIONS

Wheeler et al., "DocuSign Unveils new Scalable Product and Support Offerings of Electronic Signature and Electronic Contract Execution," DocuSign The Fastest Way to Get a Signature, 2 pp., Jan. 2008.
(Continued)

*Primary Examiner* — Ashok Patel
*Assistant Examiner* — Daniel Potratz
(74) *Attorney, Agent, or Firm* — Schwegman Lundberg & Woessner, P.A.

(57) ABSTRACT

Techniques for electronic signature processes are described. Some embodiments provide an electronic signature service ("ESS") configured to facilitate the creation, storage, and management of electronic signature documents. In one embodiment, an electronic signature document may be associated with custody transfer rules that facilitate transfers of custody of an electronic signature document from one user or party to another. A custody transfer may results in a transfer of rights or capabilities to operate upon (e.g., modify, view, send, delete) an electronic signature document and/or its associated data. A custody transfer rule may be trigged by the occurrence of a particular event, such as the receipt of an electronic signature.

19 Claims, 3 Drawing Sheets

(51) Int. Cl.
*H04N 7/16* (2011.01)
*G06F 21/62* (2013.01)
*G11B 20/00* (2006.01)
*G06F 21/64* (2013.01)

(56) References Cited

U.S. PATENT DOCUMENTS

| | | | |
|---|---|---|---|
| 5,222,138 A | 6/1993 | Balabon et al. | |
| 5,337,360 A | 8/1994 | Fischer | |
| 5,390,247 A | 2/1995 | Fischer | |
| 5,465,299 A | 11/1995 | Matsumoto et al. | |
| 5,544,255 A | 8/1996 | Smithies et al. | |
| 5,553,145 A | 9/1996 | Micali | |
| 5,615,268 A | 3/1997 | Bisbee et al. | |
| 5,629,982 A | 5/1997 | Micali | |
| 5,689,567 A | 11/1997 | Miyauchi | |
| 5,748,738 A | 5/1998 | Bisbee et al. | |
| 5,813,009 A | 9/1998 | Johnson et al. | |
| 5,832,499 A | 11/1998 | Gustman | |
| 5,872,848 A | 2/1999 | Romney et al. | |
| 5,898,156 A | 4/1999 | Wilfong | |
| 6,021,202 A | 2/2000 | Anderson et al. | |
| 6,067,531 A | 5/2000 | Hoyt et al. | |
| 6,085,322 A | 7/2000 | Romney et al. | |
| 6,092,080 A | 7/2000 | Gustman | |
| 6,119,229 A | 9/2000 | Martinez et al. | |
| 6,128,740 A | 10/2000 | Curry et al. | |
| 6,161,139 A | 12/2000 | Win et al. | |
| 6,185,587 B1 | 2/2001 | Bernardo et al. | |
| 6,185,683 B1 | 2/2001 | Ginter et al. | |
| 6,199,052 B1 | 3/2001 | Mitty et al. | |
| 6,210,276 B1 | 4/2001 | Mullins | |
| 6,237,096 B1 | 5/2001 | Bisbee et al. | |
| 6,289,460 B1 | 9/2001 | Hajmiragha | |
| 6,321,333 B1 | 11/2001 | Murray | |
| 6,327,656 B2 | 12/2001 | Zabetian | |
| 6,367,010 B1 | 4/2002 | Venkatram et al. | |
| 6,367,013 B1 | 4/2002 | Bisbee et al. | |
| 6,446,115 B2 | 9/2002 | Powers | |
| 6,470,448 B1 | 10/2002 | Kuroda et al. | |
| 6,584,466 B1 | 6/2003 | Serbinis et al. | |
| 6,615,348 B1 | 9/2003 | Gibbs | |
| 6,658,403 B1 | 12/2003 | Kuroda et al. | |
| 6,671,805 B1 | 12/2003 | Brown et al. | |
| 6,728,762 B1 | 4/2004 | Estrada et al. | |
| 6,751,632 B1 | 6/2004 | Petrogiannis | |
| 6,754,829 B1 | 6/2004 | Butt et al. | |
| 6,796,489 B2 | 9/2004 | Slater et al. | |
| 6,807,633 B1 | 10/2004 | Pavlik | |
| 6,829,635 B1 | 12/2004 | Townshend | |
| 6,912,660 B1 | 6/2005 | Petrogiannis | |
| 6,931,420 B1 | 8/2005 | Silvester et al. | |
| 6,938,157 B2 | 8/2005 | Kaplan | |
| 6,944,648 B2 | 9/2005 | Cochran et al. | |
| 6,947,911 B1 | 9/2005 | Moritsu et al. | |
| 6,959,382 B1 | 10/2005 | Kinnis et al. | |
| 6,961,854 B2 | 11/2005 | Serret-Avila et al. | |
| 6,973,569 B1 | 12/2005 | Anderson et al. | |
| 6,990,684 B2 | 1/2006 | Futamura et al. | |
| 7,039,805 B1 | 5/2006 | Messing | |
| 7,059,516 B2 | 6/2006 | Matsuyama et al. | |
| 7,069,443 B2 | 6/2006 | Berringer et al. | |
| 7,093,130 B1 | 8/2006 | Kobayashi et al. | |
| 7,100,045 B2 | 8/2006 | Yamada et al. | |
| 7,103,778 B2 | 9/2006 | Kon et al. | |
| 7,130,829 B2* | 10/2006 | Banerjee et al. | 705/51 |
| 7,162,635 B2 | 1/2007 | Bisbee et al. | |
| 7,167,844 B1 | 1/2007 | Leong et al. | |
| 7,197,644 B2 | 3/2007 | Brewington | |
| 7,237,114 B1 | 6/2007 | Rosenberg | |
| 7,340,608 B2* | 3/2008 | Laurie et al. | 713/176 |
| 7,360,079 B2 | 4/2008 | Wall | |
| 7,395,436 B1 | 7/2008 | Nemovicher | |
| 7,424,543 B2 | 9/2008 | Rice, III | |
| 7,437,421 B2 | 10/2008 | Bhogal et al. | |
| 7,523,315 B2 | 4/2009 | Hougaard et al. | |
| 7,533,268 B1 | 5/2009 | Catorcini et al. | |
| 7,554,576 B2 | 6/2009 | Erol et al. | |
| 7,562,053 B2 | 7/2009 | Twining et al. | |
| 7,568,101 B1 | 7/2009 | Catorcini et al. | |
| 7,568,104 B2 | 7/2009 | Berryman et al. | |
| 7,581,105 B2 | 8/2009 | Dietl | |
| 7,657,832 B1 | 2/2010 | Lin | |
| 7,660,863 B2 | 2/2010 | Boursetty et al. | |
| 7,660,981 B1* | 2/2010 | Hunt | 713/156 |
| 7,788,259 B2 | 8/2010 | Patterson et al. | |
| 7,934,098 B1 | 4/2011 | Hahn et al. | |
| 7,953,977 B2 | 5/2011 | Maruyama et al. | |
| 8,103,867 B2 | 1/2012 | Spitz | |
| 8,132,013 B2 | 3/2012 | Meier | |
| 8,286,071 B1 | 10/2012 | Zimmerman et al. | |
| 8,588,483 B2 | 11/2013 | Hicks et al. | |
| 8,612,349 B1 | 12/2013 | Ledder et al. | |
| 8,627,500 B2* | 1/2014 | Rogel et al. | 726/28 |
| 8,924,302 B2* | 12/2014 | Bisbee et al. | 705/50 |
| 2001/0002485 A1* | 5/2001 | Bisbee et al. | 713/167 |
| 2001/0018739 A1 | 8/2001 | Anderson et al. | |
| 2001/0034739 A1 | 10/2001 | Anecki et al. | |
| 2001/0034835 A1 | 10/2001 | Smith | |
| 2002/0004800 A1 | 1/2002 | Kikuta et al. | |
| 2002/0019937 A1 | 2/2002 | Edstrom et al. | |
| 2002/0026427 A1 | 2/2002 | Kon et al. | |
| 2002/0026582 A1 | 2/2002 | Futamura et al. | |
| 2002/0040431 A1 | 4/2002 | Kato et al. | |
| 2002/0069179 A1 | 6/2002 | Slater et al. | |
| 2002/0069358 A1 | 6/2002 | Silvester | |
| 2002/0129056 A1 | 9/2002 | Conant et al. | |
| 2002/0138445 A1 | 9/2002 | Laage et al. | |
| 2002/0143711 A1 | 10/2002 | Nassiri | |
| 2002/0162000 A1 | 10/2002 | Bensler | |
| 2002/0178187 A1 | 11/2002 | Rasmussen et al. | |
| 2002/0184485 A1 | 12/2002 | Dray et al. | |
| 2002/0194219 A1 | 12/2002 | Bradley et al. | |
| 2002/0196478 A1 | 12/2002 | Struble | |
| 2003/0048301 A1 | 3/2003 | Menninger | |
| 2003/0051016 A1 | 3/2003 | Miyoshi et al. | |
| 2003/0078880 A1 | 4/2003 | Alley et al. | |
| 2003/0120553 A1 | 6/2003 | Williams | |
| 2003/0120930 A1 | 6/2003 | Simpson et al. | |
| 2003/0131073 A1 | 7/2003 | Lucovsky et al. | |
| 2003/0140252 A1 | 7/2003 | Lafon et al. | |
| 2003/0217264 A1 | 11/2003 | Martin et al. | |
| 2003/0217275 A1 | 11/2003 | Bentley et al. | |
| 2004/0054606 A1 | 3/2004 | Broerman | |
| 2004/0078337 A1 | 4/2004 | King et al. | |
| 2004/0107352 A1 | 6/2004 | Yui et al. | |
| 2004/0117627 A1 | 6/2004 | Brewington | |
| 2004/0133493 A1 | 7/2004 | Ford et al. | |
| 2004/0181756 A1 | 9/2004 | Berringer et al. | |
| 2004/0225884 A1 | 11/2004 | Lorenzini et al. | |
| 2004/0230891 A1 | 11/2004 | Pravetz et al. | |
| 2004/0250070 A1 | 12/2004 | Wong | |
| 2004/0255114 A1 | 12/2004 | Lee et al. | |
| 2004/0255127 A1 | 12/2004 | Arnouse | |
| 2005/0033811 A1 | 2/2005 | Bhogal et al. | |
| 2005/0049903 A1 | 3/2005 | Raja | |
| 2005/0071658 A1 | 3/2005 | Nath et al. | |
| 2005/0076215 A1 | 4/2005 | Dryer | |
| 2005/0091143 A1 | 4/2005 | Schmidt et al. | |
| 2005/0120217 A1 | 6/2005 | Fifield et al. | |
| 2005/0165626 A1 | 7/2005 | Karpf | |
| 2005/0182684 A1 | 8/2005 | Dawson et al. | |
| 2005/0182956 A1 | 8/2005 | Ginter et al. | |
| 2005/0192908 A1 | 9/2005 | Jorimann et al. | |
| 2005/0231738 A1 | 10/2005 | Huff et al. | |
| 2006/0047600 A1 | 3/2006 | Bodenheim et al. | |
| 2006/0161780 A1 | 7/2006 | Berryman et al. | |
| 2006/0161781 A1 | 7/2006 | Rice et al. | |
| 2006/0174199 A1 | 8/2006 | Soltis et al. | |
| 2006/0205476 A1 | 9/2006 | Jubinville | |
| 2006/0230282 A1 | 10/2006 | Hausler | |
| 2006/0259440 A1 | 11/2006 | Leake et al. | |
| 2006/0261545 A1 | 11/2006 | Rogers | |
| 2006/0294152 A1 | 12/2006 | Kawabe et al. | |

(56) References Cited

U.S. PATENT DOCUMENTS

| | | |
|---|---|---|
| 2007/0026927 A1 | 2/2007 | Yaldoo et al. |
| 2007/0079139 A1 | 4/2007 | Kim |
| 2007/0088958 A1 | 4/2007 | Qa'Im-maqami |
| 2007/0100765 A1 | 5/2007 | Naganuma |
| 2007/0118732 A1 | 5/2007 | Whitmore |
| 2007/0130186 A1 | 6/2007 | Ramsey et al. |
| 2007/0136361 A1 | 6/2007 | Lee et al. |
| 2007/0143085 A1 | 6/2007 | Kimmel |
| 2007/0165865 A1 | 7/2007 | Talvitie |
| 2007/0198533 A1 | 8/2007 | Foygel et al. |
| 2007/0208944 A1 | 9/2007 | Pavlicic |
| 2007/0220260 A1 | 9/2007 | King |
| 2007/0271592 A1 | 11/2007 | Noda et al. |
| 2007/0289022 A1 | 12/2007 | Wittkotter |
| 2008/0016357 A1 | 1/2008 | Suarez |
| 2008/0034213 A1 | 2/2008 | Boemker et al. |
| 2008/0097777 A1 | 4/2008 | Rielo |
| 2008/0141033 A1 | 6/2008 | Ginter et al. |
| 2008/0209313 A1 | 8/2008 | Gonser |
| 2008/0209516 A1 | 8/2008 | Nassiri |
| 2008/0216147 A1 | 9/2008 | Duffy |
| 2008/0235577 A1 | 9/2008 | Veluchamy et al. |
| 2008/0260287 A1 | 10/2008 | Berryman et al. |
| 2008/0313723 A1 | 12/2008 | Naono et al. |
| 2009/0024912 A1 | 1/2009 | McCabe et al. |
| 2009/0025087 A1 | 1/2009 | Peirson, Jr. et al. |
| 2009/0044019 A1 | 2/2009 | Lee et al. |
| 2009/0099881 A1 | 4/2009 | Hanna et al. |
| 2009/0132351 A1 | 5/2009 | Gibson |
| 2009/0138730 A1 | 5/2009 | Cook et al. |
| 2009/0145958 A1 | 6/2009 | Stoutenburg et al. |
| 2009/0164488 A1 | 6/2009 | Katsurabayashi |
| 2009/0185241 A1 | 7/2009 | Nepomniachtchi |
| 2009/0268903 A1 | 10/2009 | Bojinov et al. |
| 2009/0292786 A1 | 11/2009 | Mccabe et al. |
| 2010/0088364 A1 | 4/2010 | Carter et al. |
| 2010/0122094 A1 | 5/2010 | Shima |
| 2010/0153011 A1 | 6/2010 | Obrea et al. |
| 2010/0217987 A1 | 8/2010 | Shevade |
| 2010/0235727 A1 | 9/2010 | Ashton et al. |
| 2010/0242085 A1 | 9/2010 | Dutta et al. |
| 2010/0274863 A1 | 10/2010 | Foygel et al. |
| 2010/0287260 A1 | 11/2010 | Peterson et al. |
| 2010/0293094 A1 | 11/2010 | Kolkowitz et al. |
| 2011/0093769 A1 | 4/2011 | Dunn et al. |
| 2011/0119165 A1 | 5/2011 | Zee |
| 2011/0126022 A1 | 5/2011 | Sieberer |
| 2011/0153560 A1* | 6/2011 | Bryant et al. ................ 707/610 |
| 2011/0238510 A1 | 9/2011 | Rowen et al. |
| 2011/0264907 A1 | 10/2011 | Betz et al. |
| 2011/0314371 A1 | 12/2011 | Peterson et al. |
| 2012/0072837 A1* | 3/2012 | Triola ........................ 715/268 |
| 2012/0180135 A1 | 7/2012 | Hodges et al. |
| 2012/0209970 A1 | 8/2012 | Scipioni et al. |
| 2012/0271882 A1 | 10/2012 | Sachdeva et al. |
| 2012/0304265 A1 | 11/2012 | Richter et al. |
| 2013/0019156 A1 | 1/2013 | Gonser et al. |
| 2013/0019289 A1 | 1/2013 | Gonser et al. |
| 2013/0050512 A1 | 2/2013 | Gonser et al. |
| 2013/0060661 A1* | 3/2013 | Block et al. ................ 705/26.44 |
| 2013/0067243 A1 | 3/2013 | Tamayo-Rios et al. |
| 2013/0159720 A1 | 6/2013 | Gonser et al. |
| 2013/0179676 A1 | 7/2013 | Hamid |
| 2013/0254111 A1 | 9/2013 | Gonser et al. |
| 2013/0263283 A1 | 10/2013 | Peterson et al. |
| 2014/0019761 A1 | 1/2014 | Shapiro |

FOREIGN PATENT DOCUMENTS

| | | |
|---|---|---|
| JP | 2000048072 | 2/2000 |
| JP | 2003271529 | 9/2003 |
| JP | 2005267438 | 9/2005 |
| JP | 2008117258 | 5/2008 |
| JP | 2008225527 | 9/2008 |
| KR | 20000049674 | 8/2000 |
| KR | 1020020092595 | 12/2002 |
| KR | 1020070059931 | 6/2007 |
| KR | 100929488 | 12/2009 |
| KR | 20090122657 | 12/2009 |
| RU | 2400811 | 11/2005 |
| RU | 2291491 | 10/2007 |
| RU | 2300844 | 6/2010 |
| WO | 9607156 | 3/1996 |
| WO | 03091834 | 11/2003 |
| WO | 2007075235 | 7/2007 |
| WO | 2008124627 | 10/2008 |
| WO | 2009012478 | 1/2009 |
| WO | 2010105262 | 9/2010 |

OTHER PUBLICATIONS

Borozdin et al., "DocuSign Connect Service Guide," DocuSign, Inc., pp. 1-9, 2008.

eLynx Adds Workflow Management to Electronic Document Platform—new Workflow Capabilities Provide for Enhanced Electronic Loan Processing, eLynx, http://www.elynx.com/news/view/82, 2 pp. Jan. 2009.

Laurens Leurs; The history of PDF; Feb. 14, 2010; Prepressure.com; pp. 1-12.

Brown, "Digital Signatures: Can They Be Accepted As Legal Signatures in EID?", Dec. 1993, ACM, p. 86-92.

Herzberg et al., "Surf'N'Sign: Client Signatures on Web Documents", 1998, IEEE, vol. 37 Issue 1, p. 61-71.

Kwok et al., "An Automatic Electronic Contract Document Signing System in a Secure Environment", 2005, IEEE, p. 497-502.

Su et al., "Signature-In-Signature Verification Via a Secure Simple Network Protocol", 2010, IEEE, p. 1-4.

Zefferer et al., "An Electronic-Signature Based Circular Resolution Database System," Mar 2010, ACM, p. 1840-1845.

Kamara et al., "Cryptographic Cloud Storage", 2010, Financial Cryptography and Data Security, p. 136-149.

Harold, Elliotte Rusty, XML Bible. IDG Books Worldwide, Inc., 1999, p. 191-192.

"European Application Serial No. 13764546.1, Extended European Search Report mailed Oct. 30, 2015", 6 pgs.

Du, Timon C, et al., "Document access control in organisational workflows", International Journal Of Information And Computer Security, vol. 1, No. 4, (2007), 437-454.

* cited by examiner

SYSTEM AND METHOD FOR RULES-BASED CONTROL OF CUSTODY OF ELECTRONIC SIGNATURE TRANSACTIONS

PRIORITY CLAIM

This application claims the benefit of U.S. Provisional Application No. 61/614,371, filed Mar. 22, 2012.

FIELD OF THE INVENTION

The present disclosure relates to systems and methods for electronic signatures and, more particularly, to systems and methods for rules-based control of custody of electronic signature documents.

BRIEF DESCRIPTION OF THE DRAWINGS

Preferred and alternative examples of the present invention are described in detail below with reference to the following drawings.

DETAILED DESCRIPTION

Embodiments described herein provide enhanced computer- and network-based methods and systems for facilitating electronic signatures. Example embodiments provide an electronic signature service ("ESS") configured to facilitate the creation, storage, and management of documents and corresponding electronic signatures. Using the ESS, a first user (a "sender") can provide or upload a document to be signed ("a signature document"), while a second user (a "signer") can access, review, and sign the uploaded document.

Some embodiments of the ESS facilitate rules-based control of custody of electronic signature documents. In one embodiment, an electronic signature document includes or is associated with custody transfer rules (or simply, "custody rules") that govern, control, or facilitate transfers of custody of an electronic signature document from one user or party to another. A custody transfer typically results in a transfer of rights or capabilities to operate upon (e.g., modify, view, send, delete) an electronic signature document and/or its associated data (e.g., history, form data, signature data). In some embodiments, when an electronic signature document changes custody, a first party associated with the document (e.g., that created, edited, or sent the document) loses one or more previously held rights to the document while a second party gains those and possibly other rights. For example, upon custody transfer, a first user (e.g., the initial document sender) may lose the right to edit or delete the document, while a second user (e.g., a manager) may gain the rights to view, edit, and delete the document. The first user may in some embodiments or configurations retain some rights, such as "read only" access allowing the first user to view the document.

Custody transfer rules may also specify conditions under which transfers of custody are to take place. For example, a sales organization may have two distinct types of users: sales representatives and sales managers. A sales representative may create an electronic signature document (or clone or copy an existing one) that represents a sales contract with a customer. Such an electronic signature document may be associated with custody transfer rules that cause custody of the document to transfer from the sales representative to the sales manager upon the occurrence of one or more events, such as when a customer completes an electronic signature, thereby closing a sale or otherwise completing a transaction. Other conditions may be specified, such as when the sales representative initially sends the electronic signature document to the customer, when a customer indicates refusal to sign the electronic signature document, when a specified amount or period of time passes, or the like.

Figure 1:
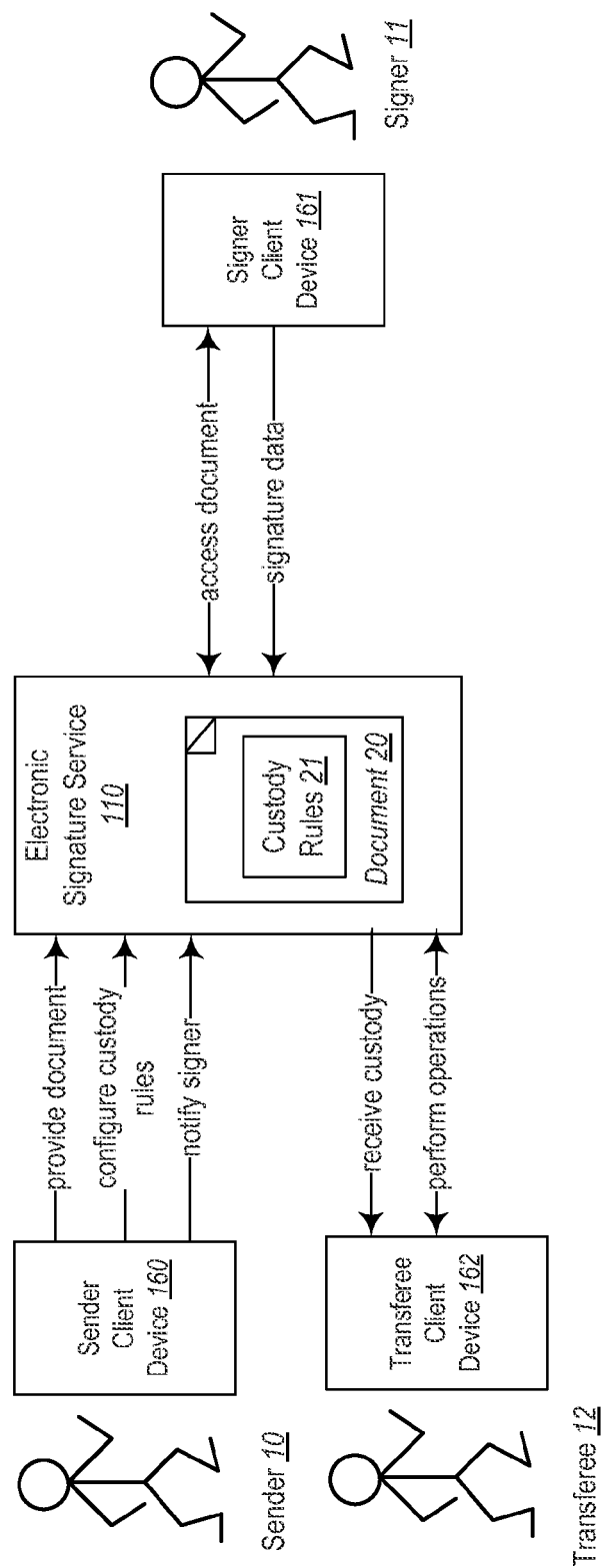
FIG. 1 illustrates an example block diagram of an example embodiment of an electronic signature service.

FIG. 1 illustrates an example block diagram of an example embodiment of an electronic signature service. In particular, FIG. 1 depicts an ESS 110 utilized by a sender user 10 and a signer user 11 to perform an electronic signing of a signature document 20. FIG. 1 also depicts a transferee 12 who receives custody of the signature document 20.

In the illustrated scenario, the sender 10 operates a sender client device 160 in order to provide (e.g., upload, transmit) an electronic document 20 (e.g., an invoice, contract, or agreement) to the ESS 110, where it is securely stored. The electronic document includes or is associated with custody rules 21 that are configured to cause custody of the document 20 to transfer from the sender 10 to the transferee 12, possibly upon the occurrence of one or more conditions. In some embodiments or configurations, the sender 10 and transferee 12 may be in or work for the same organization. For example, the sender 10 may be a sales representative while the transferee 12 may be a sales manager or an in-house attorney who reviews and records sales contracts. In other situations, the sender 10 and transferee 12 may work for distinct organizations or entities.

The sender 10 and/or some other user (e.g., an administrator) may configure the document 20 and/or the custody rules 21. For example, an administrator may interact with a user interface configured to facilitate the specification of custody rules and associated conditions. The custody rules 21 are then stored by the ESS 110 in association with the document 20. In this example, the custody rules 21 are configured to cause custody of the document 20 to transfer to the transferee upon signature by the signer 11. At this time, the sender 10 may further modify, configure, or customize the document 20, such as by changing price and quantity terms, party names, dates, and the like.

After the sender 10 configures the document 20 to his satisfaction, the signer 11 may access the document 20. In one embodiment, the sender 10 notifies the signer 11, such as by causing the ESS 110 to send to the signer 11a message (e.g., an email) that includes a reference (e.g., a URL) to the document 20 stored by the ESS 110. As another example, the sender 10 may directly include the document 20 in an email or other message transmitted to the signer 11. As a further example, the document 20 may be automatically presented to the signer 11 as part of a transaction. For example, an e-commerce system may cause the document 20 to be presented or transmitted to the signer 11 during or as part of a transaction for a good/service purchased via the e-commerce system.

Typically, the signer 11 operates a Web browser or other client module executing on the signer client device 161 to access and review the document 20 via the ESS 110. For example, if the signer 11 receives an email that includes a link to the document 20, the signer can click the link to visit the ESS 110 in order review and sign the document 20. If instead the signer 11 receives the document 20 itself directly from the sender 10, opening the document will also cause the user to visit the ESS 110 to provide the required signature information. When the document 20 and related data have been reviewed (and possibly modified) to the satisfaction of the signer 11, the signer attaches (or provides an indication or instruction to attach) his electronic signature to the document 20.

Once the signing has been completed, the ESS 110 causes custody of the document 20 to change from the sender 10 to the transferee 12. At this time, the sender 10 may lose one or more rights, such as the right to view, modify, or delete the document 20. In addition, the transferee 12 may gain one or more rights, such as the right to view, modify, or delete the document 20. The transferee 12 can access and perform various operations (e.g., view, modify, delete) via the transferee client device 162. Custody transfer rules may specify custody chains or sequences of arbitrary length (e.g., more than the two parties shown in this example). For example, custody of a document may transfer from a sales representative to a sales manager and thence to an in-house attorney.

In some embodiments, the document 20 may be associated with an envelope or other data structure that functions as a container that includes the document 20 (or a reference thereto) along with meta-information, including signature information, sender information (e.g., names, addresses), recipient/signer information (e.g., email addresses, names), and the like. Custody rules may be configured to manage access to an envelope and its related information. For example, one custody rule may specify that once the sender 10 has transferred control to the transferee 12, the sender 10 may view but not modify envelope information including the document 20. The transferee 11, in turn, may receive additional rights, such as to delete the document 20, view information added to a form associated with the document 20, clone the document 20, or the like. In some embodiments, a user may upload a file that contains information about multiple documents for which custody is to be transferred, so as to effect a bulk transfer from one party to another.

Figure 2:
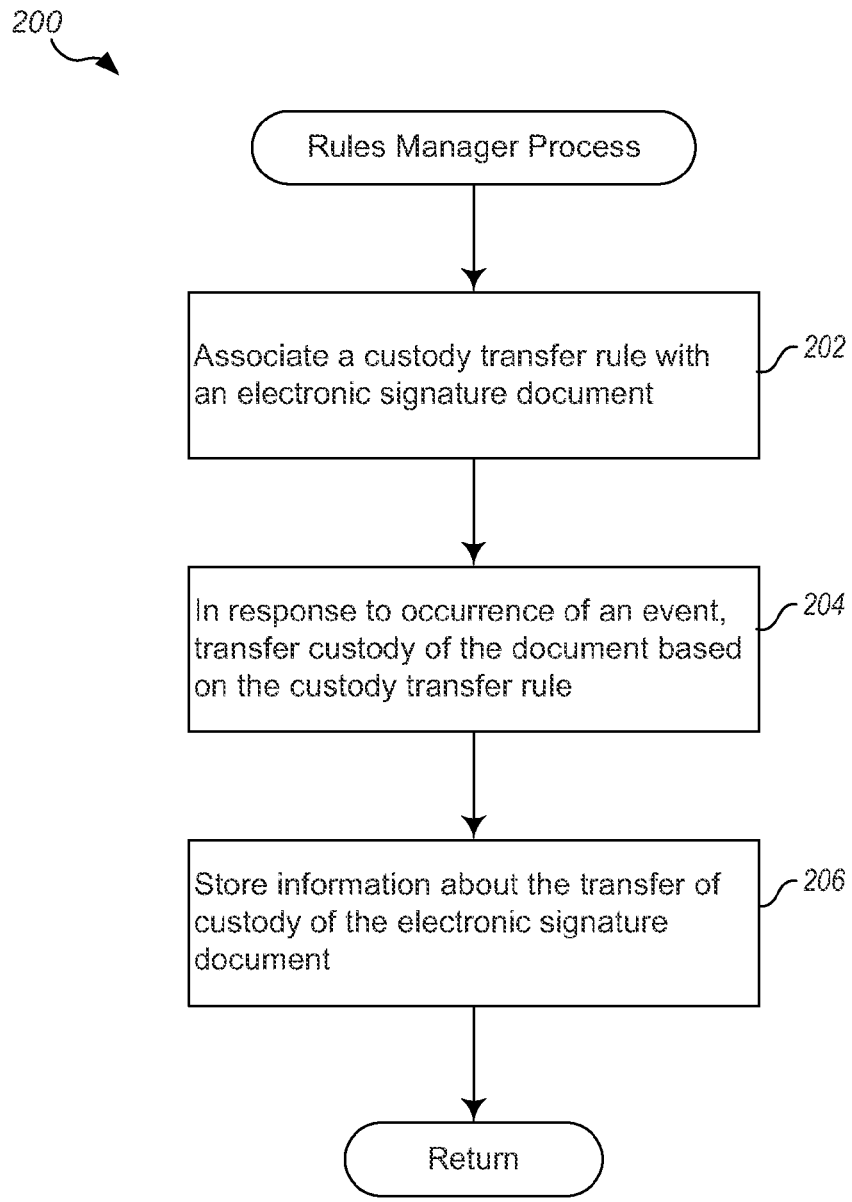
FIG. 2 is a flow diagram of an example rules manager process according to an example embodiment.

FIG. 2 is a flow diagram of an example rules manager process 200 according to an example embodiment. The process of FIG. 2 may be performed by the ESS 110.

The illustrated process begins at block 202, where it associates a custody transfer rule with an electronic signature document. Associating a custody rule may include storing data structure or record that relates the custody rule with the document. The custody rule itself may be a data structure or record that includes indications of the document, users impacted by the custody rule, conditions or events that trigger custody transfers, access rights impacted by the rule, or the like.

At block 204, the process, in response to occurrence of an event, transfers custody of the document based on the custody transfer rule. Transferring custody may include removing one or more access rights from the first user, and in turn, granting those access rights to a second user. Different kinds of events may trigger the transfer operation, including the presentation (e.g., viewing), receipt, signature, or other operation upon or with respect to a signature document. Some events may be time based, so that custody transfers are triggered upon a passage of time or on a specified calendar day.

At block 206, the process stores information about the transfer of custody of the electronic signature document. Storing information about custody transfer may include updating a data structure or record to reflect a new document owner, to remove rights from one user, to grant rights to another user, or the like. After block 206, the process ends.

The process may perform additional or different operations. In some embodiments, the process may also enforce access rules governed by the custody rule. For example, when the process receives an indication that a user is attempting to perform some operation (e.g., view, edit, delete) with respect to the signature document or its meta-data, the process may allow or disallow the operation based on a determination whether the user has the appropriate access rights to perform the indicated operation.

Figure 3:
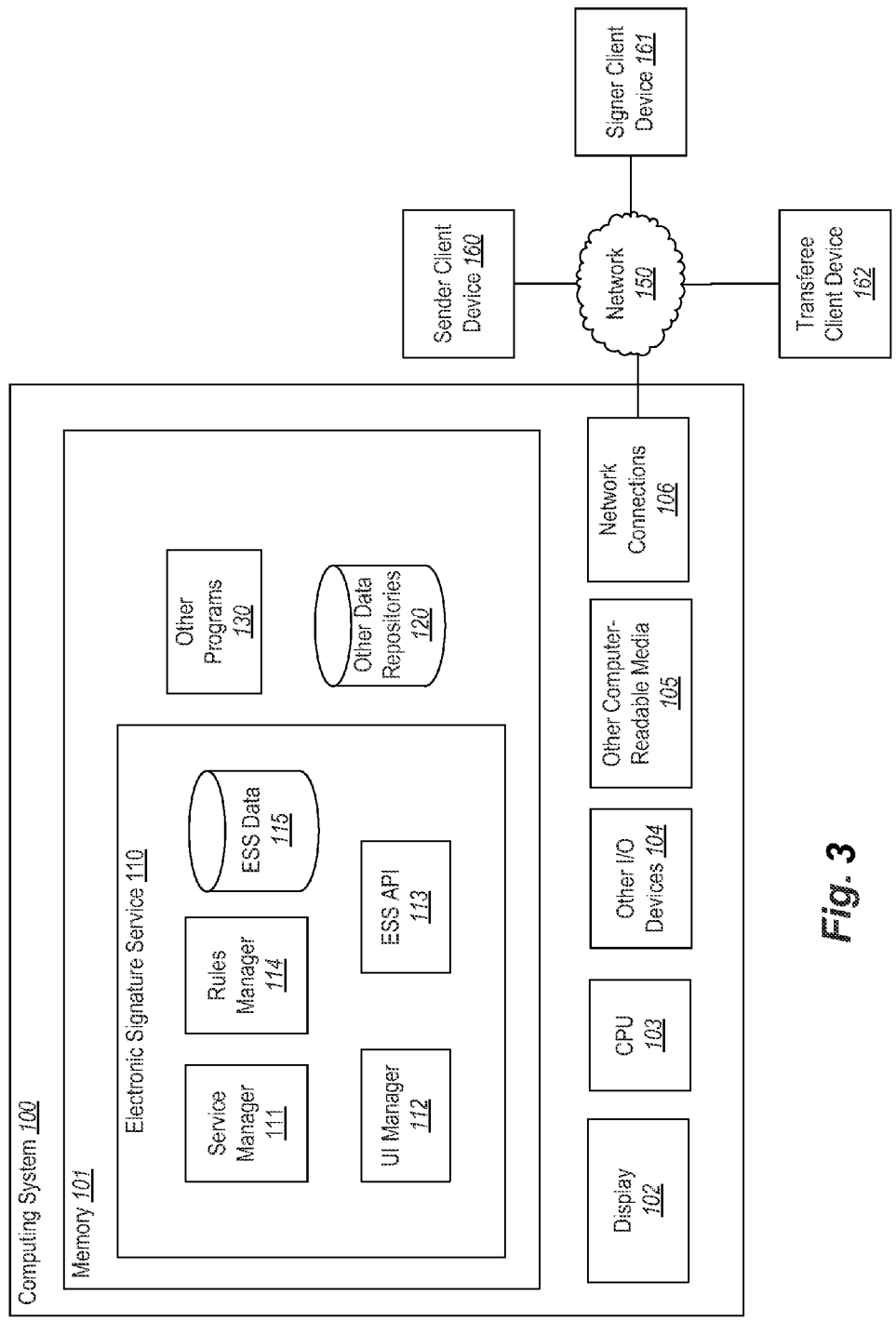
FIG. 3 is a block diagram of an example computing system for implementing an electronic signature service according to an example embodiment.

FIG. 3 is a block diagram of an example computing system for implementing an electronic signature service according to an example embodiment. In particular, FIG. 3 shows a computing system 100 that may be utilized to implement an ESS 110.

Note that one or more general purpose or special purpose computing systems/devices may be used to implement the ESS 110. In addition, the computing system 100 may comprise one or more distinct computing systems/devices and may span distributed locations. Furthermore, each block shown may represent one or more such blocks as appropriate to a specific embodiment or may be combined with other blocks. Also, the ESS 110 may be implemented in software, hardware, firmware, or in some combination to achieve the capabilities described herein.

In the embodiment shown, computing system 100 comprises a computer memory ("memory") 101, a display 102, one or more Central Processing Units ("CPU") 103, Input/Output devices 104 (e.g., keyboard, mouse, CRT or LCD display, and the like), other computer-readable media 105, and network connections 106 connected to a network 150. The ESS 110 is shown residing in memory 101. In other embodiments, some portion of the contents, some or all of the components of the ESS 110 may be stored on and/or transmitted over the other computer-readable media 105. The components of the ESS 110 preferably execute on one or more CPUs 103 and manage electronic signature processes including custody transfers as described herein. Other code or programs 130 (e.g., an administrative interface, a Web server, and the like) and potentially other data repositories, such as data repository 120, also reside in the memory 101, and preferably execute on one or more CPUs 103. Of note, one or more of the components in FIG. 3 may not be present in any specific implementation. For example, some embodiments may not provide other computer readable media 105 or a display 102.

The ESS 110 includes a service manager 111, a user interface ("UI") manager 112, an electronic signature service application program interface ("API") 113, a rules manager 114, and an electronic signature service data store 115.

The ESS 110, via the service manager 111 and related logic, generally performs electronic signature-related functions for or on behalf of users operating a sender client device 160, a signer client device 161, and a transferee client device 162. In one embodiment, a sender operating the sender client device 160 provides (e.g., transmits, uploads, sends) a document to be electronically signed to the ESS 110. The ESS 110 stores the document securely in data store 115. Secure document storage may include using cryptographic techniques to detect document tampering, such as generating hashes, message digests, or the like. In some embodiments, the document is stored as part of (or in association with) an "envelope" that is used to track and record information about the document as it progresses through its lifecycle of creation, transfer, signature, completion, and the like.

A signer operating the signer client device 161 then accesses, reviews, and signs the document stored by the ESS 110. In some embodiments, the ESS 110 transmits images or some other representation of the document to the signer client device 161, which in turn transmits signature data including an indication of the signer's signature (or intent to sign) to the ESS 110. The ESS 110 then securely stores the provided signature data in association with the document in the data store 115.

The rules manager 114 facilitates custody transfers of electronic signature documents as discussed herein. Initially, a sender or other user operating the sender client device 160 may associate custody transfer rules with an electronic signature document stored in the data store 115. The rules manager 114 tracks and executes the specified rules as appropriate. For example, if a rule indicates custody transfer upon document signature, the rules manager 114 monitors the document and, in response to a received signature, modifies (or causes to be modified) data structures or other records that specify or control access rights or operations associated with the document. In particular, access rights may be removed or disassociated from a first user. In addition or instead, the same or different access rights may be granted or otherwise associated with a second user. In some embodiments, custody transfers may occur between groups of users.

A custody transfer rule may be represented as a data structure, record in a database, or similar. The custody transfer rule may include indications of users that are impacted by the rule, events that trigger the rule, and access rights (e.g., view, modify, delete) that are shifted based on the rule and one or more events.

The UI manager 112 provides a view and a controller that facilitate user interaction with the ESS 110 and its various components. For example, the UI manager 112 may provide interactive access to the ESS 110, such that users can upload or download documents for signature, create and/or configure custody rules associated with or incorporated into signature documents, and the like. In some embodiments, access to the functionality of the UI manager 112 may be provided via a Web server, possibly executing as one of the other programs 130. In such embodiments, a user operating a Web browser (or other client) executing on one of the client devices 160-162 can interact with the ESS 110 via the UI manager 112.

The API 113 provides programmatic access to one or more functions of the ESS 110. For example, the API 113 may provide a programmatic interface to one or more functions of the ESS 110 that may be invoked by one of the other programs 130 or some other module. In this manner, the API 113 facilitates the development of third-party software, such as user interfaces, plug-ins, news feeds, adapters (e.g., for integrating functions of the ESS 110 into Web applications), and the like. In addition, the API 113 may be in at least some embodiments invoked or otherwise accessed via remote entities, such as a third-party system (not shown), to access various functions of the ESS 110. For example, a customer relationship management system may push or otherwise import customer data and/or agreements into the ESS via the API 113.

The data store 115 is used by the other modules of the ESS 110 to store and/or communicate information. The components of the ESS 110 use the data store 115 to record various types of information, including documents, signatures, custody rules, and the like. Although the components of the ESS 110 are described as communicating primarily through the data store 115, other communication mechanisms are contemplated, including message passing, function calls, pipes, sockets, shared memory, and the like.

The ESS 110 interacts via the network 150 with client devices 160-162. The network 150 may be any combination of one or more media (e.g., twisted pair, coaxial, fiber optic, radio frequency), hardware (e.g., routers, switches, repeaters, transceivers), and one or more protocols (e.g., TCP/IP, UDP, Ethernet, Wi-Fi, WiMAX) that facilitate communication between remotely situated humans and/or devices. In some embodiments, the network 150 may be or include multiple distinct communication channels or mechanisms (e.g., cable-based and wireless). The client devices 160-162 include personal computers, laptop computers, smart phones, personal digital assistants, tablet computers, and the like.

In an example embodiment, components/modules of the ESS 110 are implemented using standard programming techniques. For example, the ESS 110 may be implemented as a "native" executable running on the CPU 103, along with one or more static or dynamic libraries. In other embodiments, the ESS 110 may be implemented as instructions processed by a virtual machine that executes as one of the other programs 130. In general, a range of programming languages known in the art may be employed for implementing such example embodiments, including representative implementations of various programming language paradigms, including but not limited to, object-oriented (e.g., Java, C++, C#, Visual Basic-.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the ESS 110, such as in the data store 118, can be available by standard mechanisms such as through C, C++, C#, and Java APIs; libraries for accessing files, databases, or other data repositories; through scripting languages such as XML; or through Web servers, FTP servers, or other types of servers providing access to stored data. The data store 118 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the ESS 110 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

It should be apparent to those skilled in the art that many more modifications besides those already described are possible without departing from the inventive concepts herein. Moreover, in interpreting both the specification and the claims, all terms should be interpreted in the broadest possible manner consistent with the context. In particular, the terms "includes," "including," "comprises," and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring one or more elements from the set {A, B, C, . . . N}, and not N in addition to one or more elements from the set {A, B, C}.

All of the above-cited references, including U.S. Provisional Application No. 61/614,371, filed Mar. 22, 2012, entitled "SYSTEM AND METHOD FOR RULES-BASED CONTROL OF CUSTODY OF ELECTRONIC SIGNATURE TRANSACTIONS" are incorporated herein by reference in their entireties. Where a definition or use of a term in an incorporated reference is inconsistent with or contrary to the definition or use of that term provided herein, the definition or use of that term provided herein governs.

While the preferred embodiment of the invention has been illustrated and described, as noted above, many changes can be made without departing from the spirit and scope of the invention. Accordingly, the scope of the invention is not limited by the disclosure of the preferred embodiment.

The embodiments of the invention in which an exclusive property or privilege is claimed are defined as follows:

1. A method executed by an electronic signature service (ESS) computing device, the method comprising:
   receiving an electronic signature document and associating a custody transfer rule with the electronic signature document from a client device associated with a first user, the custody transfer rule comprising a data structure used by the ESS computing device and further comprising:
      data identifying users in a custody chain for the electronic signature document; and
      data identifying an event to transition custody of the electronic signature document from a first user of the custody chain to a second user of the custody chain, the custody of the electronic signature document comprising an access right with respect to the electronic signature document, and the event comprising a response to an electronic signature request;
   transmitting the electronic signature request to a client device associated with a third user not included in the custody chain;
   in response to detecting the event, transferring custody of the electronic signature document from the first user to the second user according to the custody transfer rule; and
   storing data indicating the transfer of custody of the electronic signature document to prevent the client device associated with the first user from accessing the electronic signature document according to the access right with respect to the electronic signature document, and to allow access to the electronic signature document according to the access right with respect to the electronic signature document to a client device associated with the second user.

2. The method of claim 1, wherein the response to the electronic signature request comprises one of:
   a receipt of signature of the electronic signature document by the third user; or
   a refusal of signature of the electronic signature document by the third user.

3. The method of claim 2, wherein the response to the electronic signature request comprises the receipt of signature of the electronic signature document by the third user, and the method further comprises:
   storing a second data structure comprising information corresponding to the signature of the electronic signature document, including information identifying the third user, date information, history information, and form data entered by the third user.

4. The method of claim 3, wherein after transferring custody of the electronic signature document from the first user to the second user, the first user retains a second access right to view the electronic signature document and to view the second data structure comprising information corresponding to the signature of the electronic signature document.

5. The method of claim 3, wherein the access right comprises access to view the electronic signature document and to view the second data structure comprising information corresponding to the signature of the electronic signature document.

6. The method of claim 1, wherein the access right comprises a right to modify the contents of electronic signature document.

7. The method of claim 1, wherein the access right comprises a right to delete the electronic signature document from the ESS computing device.

8. A computer-readable non-transitory medium comprising instructions that, when executed by a computing system, facilitate custody transfers of electronic signature documents, by performing a method comprising:
   receiving an electronic signature document and associating a custody transfer rule with the electronic signature document from a client device associated with a first user, the custody transfer rule comprising a data structure used by an electronic signature service (ESS) and further comprising:
  data identifying users in a custody chain for the electronic signature document; and
  data identifying an event to transition custody of the electronic signature document from a first user of the custody chain to a second user of the custody chain, the custody of the electronic signature document comprising an access right with respect to the electronic signature document, and the event comprising a response to an electronic signature request;
transmitting the electronic signature request to a client device associated with a third user not included in the custody chain;
in response to detecting the event, transferring custody of the electronic signature document from the first user to the second user according to the custody transfer rule; and
storing data indicating the transfer of custody of the electronic signature document to prevent any client device associated with the first user from accessing the electronic signature document according to the access right with respect to the electronic signature document, and to allow access to the electronic signature document according to the access right with respect to the electronic signature document to a client device associated with the second user.

9. The computer-readable non-transitory medium of claim 8, wherein the method further comprises:
transmitting an email to the third user, the email including a link operable to access the electronic signature document at the electronic signature service, wherein the event comprises receiving an indication that the third user has activated the link to access the electronic signature document.

10. The computer readable non-transitory medium of claim 8, wherein the response to the electronic signature request comprises one of:
a receipt of signature of the electronic signature document by the third user; or
a refusal of signature of the electronic signature document by the third user.

11. The computer readable non-transitory medium of claim 10, wherein the response to the electronic signature request comprises the receipt of signature of the electronic signature document by the third user, and the method further comprises:
storing a second data structure comprising information corresponding to the signature of the electronic signature document, including information identifying the third user, date information, history information, and form data entered by the third user.

12. The computer readable non-transitory medium of claim 11, wherein after transferring custody of the electronic signature document from the first user to the second user, the first user retains a second access right to view the electronic signature document and to view the second data structure comprising information corresponding to the signature of the electronic signature document.

13. The computer readable non-transitory medium of claim 11, wherein the access right comprises access to view the electronic signature document and to view the second data structure comprising information corresponding to the signature of the electronic signature document.

14. A computing system configured to facilitate custody transfers of electronic signature documents, comprising:
a hardware processor
to:
  receive an electronic signature document and associate a custody transfer rule with the electronic signature document from a client device associated with a first user, the custody transfer rule comprising a data structure used by an electronic signature service (ESS) and further comprising:
    data identifying users in a custody chain for the electronic signature document; and
    data identifying an event to transition custody of the electronic signature document from a first user of the custody chain to a second user of the custody chain, the custody of the electronic signature document comprising an access right with respect to the electronic signature document, and the event comprising a response to an electronic signature request;
  transmit the electronic signature request to a client device associated with a third user not included in the custody chain;
  in response to detecting the event, transfer custody of the electronic signature document from the first user to the second user according to the custody transfer rule; and
  store data indicating the transfer of custody of the electronic signature document to prevent the client device associated with the first user from accessing the electronic signature document according to the access right with respect to the electronic signature document, and to allow access to the electronic signature document according the access right with respect to the electronic signature document to a client device associated with the second user.

15. The computing system of claim 14, wherein the custody transfer rule specifies, for each of multiple operations to access the electronic signature document according to the access right with respect to the electronic signature document, whether each of the first and second user can perform the operation before and after the occurrence of the event, wherein the access right includes at least one of viewing, modifying, or deleting information related to the electronic signature document.

16. The system of claim 14, wherein the response to the electronic signature request comprises one of:
a receipt of signature of the electronic signature document by the third user; or
a refusal of signature of the electronic signature document by the third user.

17. The system of claim 16, wherein the response to the electronic signature request comprises the receipt of signature of the electronic signature document by the third user, and the hardware processor is further configured to:
store a second data structure comprising information corresponding to the signature of the electronic signature document, including information identifying the third user, date information, history information, and form data entered by the third user.

18. The system of claim 17, wherein after the transfer of custody of the electronic signature document from the first user to the second user, the first user is to retain a second access right to view the electronic signature document and to view the second data structure comprising information corresponding to the signature of the electronic signature document.

19. The system of claim 17, wherein the access right comprises access to view the electronic signature document and to view the second data structure comprising information corresponding to the signature of the electronic signature document.

* * * * *